United States Patent [19]
Daniels et al.

[11] Patent Number: 5,711,573
[45] Date of Patent: Jan. 27, 1998

[54] SELECTIVELY DEFORMABLE SEAT

[75] Inventors: Jerry Daniels; Michael E. Simonson, both of Ooltewah, Tenn.

[73] Assignee: Ooltewah Manufacturing, Inc., Ooltewah, Tenn.

[21] Appl. No.: 615,615

[22] Filed: Mar. 13, 1996

[51] Int. Cl.$^6$ ........................................................ B62J 1/26
[52] U.S. Cl. ........................ 297/199; 297/284.6; 297/204
[58] Field of Search .................................... 297/199, 200, 297/204, 214, 284.1, 284.2, 284.6, DIG. 3

[56] References Cited

U.S. PATENT DOCUMENTS

| | | | |
|---|---|---|---|
| 3,758,153 | 9/1973 | Bonikowsky | 297/199 |
| 4,960,304 | 10/1990 | Frantz | 297/284.6 |
| 5,353,734 | 10/1994 | Tani | 297/199 X |

FOREIGN PATENT DOCUMENTS

| | | | |
|---|---|---|---|
| 2306866 | 4/1975 | France | 297/199 |
| 6884 | of 1897 | United Kingdom | 297/199 |

Primary Examiner—Laurie K. Cranmer
Attorney, Agent, or Firm—Alan Ruderman

[57] ABSTRACT

A motorcycle seat has a shape forming base on which a selectively deformable cushion is positioned and covered by an exterior covering, the cushion having a foam material encased within an airtight bladder. A valve member located externally of the covering has a conduit which extends through the bladder in sealed fashion and terminates within the foam material. The valve may be selectively opened, and when open while a compressible force is applied on the foam, air is expelled from the foam, and if the valve is then closed the foam is formed into the shape of the force applicator. With the valve closed, movement upon the cushion redistributes the air within the foam accordingly. When the compression force is relieved and the valve is opened, the cushion takes on its original shape. A motorcycle rider sitting on the seat applies the compression force. The construction may be used for seats of any type since it resists the soft tissue of the buttocks from spreading aside and reduces capillary closure pressure by redistributing the pressure.

8 Claims, 1 Drawing Sheet

SELECTIVELY DEFORMABLE SEAT

BACKGROUND OF THE INVENTION

This invention relates to seats which may be selectively deformed to the shape of the user and more particularly to a seat which may be deformed selectively to permit evacuation of the air therein upon forcible compression of the seat and to permit re-entry of the air upon release of the compression force or to prevent the re-entry of the air to maintain the deformed shape.

It is known to provide a seat with a resilient foam cushion encased within a covering. When one sits on such a seat the foam cushioning compresses as air is expelled from the cells of the foam. The air either exits through the cover itself or leaks out of the cover since the covers are porous and in any event are not air tight. Thereafter when the compression is released from the seat by the person getting up, the seat reforms by air re-entering the cells of the foam until the foam looses its resiliency and is no longer effectively compressible, i.e., no longer holds its original uncompressed shape. When such a foam is applied to the rigid base of a seat, such as the seat of a motorcycle, the cushioning effect is minimal after the user has been seated on the seat for some time. The same is true in regard to other seats including those in automobiles, wheel chairs, stadium cushions, office chairs and the like. The air is evacuated and the rigid base beneath it provides the support. Most of such seats are thus very hard, and the position of the seated person is fixed. In regard to a motorcycle, there is no adjustability in the height of the seat provided by the seat itself. The pressure points of the rider's body on the seat thus remains stationary and during extended travel the rider's legs and buttocks may become numb and the legs may "fall asleep." The reason for this is that the soft tissues of the buttocks spreads and the pelvis or bony prominences settle resulting in capillary closing which occurs at about 32 mm. of mercury.

SUMMARY OF THE INVENTION

Consequently, it is a primary object of the present invention to provide a seat having a foam cushion which permits air to be evacuated and returned into the cells of the foam selectively.

It is another object of the present invention to provide a seat which permits a person seated thereon to vary the pressure points of his or her body on the seat by redistributing the air within the seat selectively.

It is a further object of the present invention to provide a seat for a motorcycle which permits a rider to vary the pressure points of the rider's body on the seat by distributing the air within the seat selectively so that the position of the rider's lower limbs may be periodically changed.

It is a still further object of the present invention to provide a seat for a motorcycle which permits the height of the seat above the road to be changed selectively.

Accordingly, the present invention provides a seat including a shape forming base on which a selectively deformable cushion is disposed and covered by an exterior covering. The cushion comprises a plastic foam material encased within an airtight skin or bladder and a valve member located externally of the covering and communicating in sealed relationship through the skin into the foam. Thus, the air within the foam may only exit the foam when the valve is open while a compressible force is applied to the foam. When a person sits on the seat and opens the valve, air within the cells of the foam is expelled in accordance with the force applied by the contacting members of the person. The seat shapes itself to the shape of the user's buttocks in the initial seating position, but the air within the seat may be redistributed as the seated person changes position with the valve closed. This permits the pressure points of the user on the seat to be distributed evenly. Additionally, air may be either further exhausted when the user changes positions and opens the valve, or air may re-enter the cells of the foam when the force due to the weight of the user is released from the foam. Since the air may be selectively exhausted and retained by the cells of the foam, a seat of this construction permits an adjustability to the height of the seat relative to the ground. The cushion may be used for substantially any type of seat, including the seats of a motorcycle, an automobile, office chairs, wheel chair seats, and stadium seat cushions and the like. A motorcycle seat having this construction permits the rider to have a greater cushioning effect on the road and permits more air to be exhausted selectively when used in the city where there is frequent stoppage and the rider's feet more frequently engage the ground.

BRIEF DESCRIPTION OF THE DRAWINGS

The invention will be described in conjunction with a motorcycle seat and particular features and advantages of the invention as well as other objects are applicable to other seats and will become apparent from the following description taken in connection with the accompanying drawings in which.

DESCRIPTION OF THE PREFERRED EMBODIMENT

Figure 1:
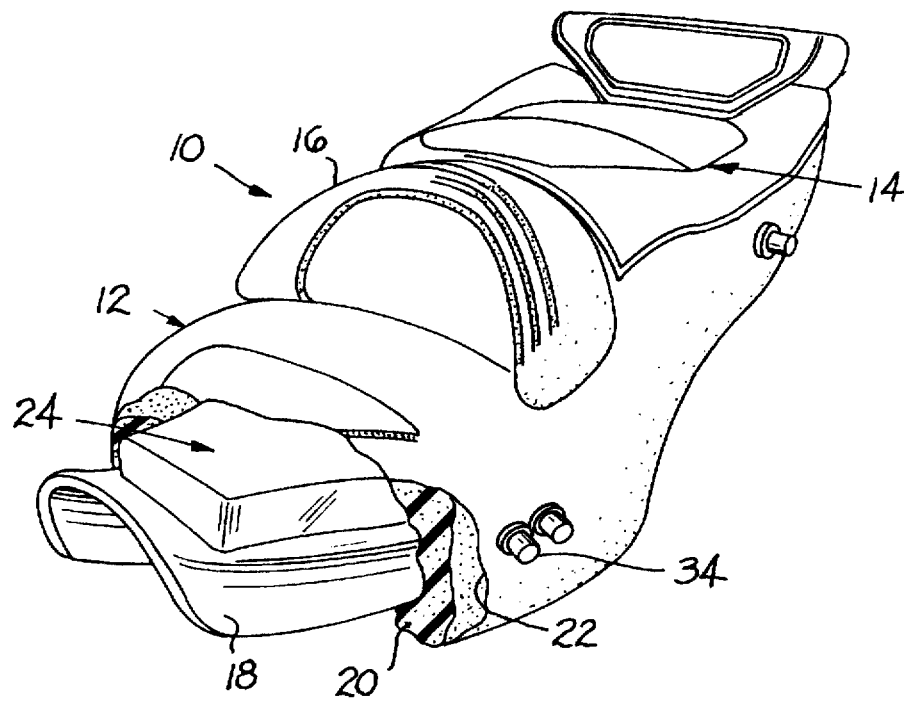
FIG. 1 is a perspective view partly broken away illustrating a motorcycle seat incorporating cushioning constructed in accordance with the principles of the present invention.

Referring to the drawings, FIG. 1 illustrates a motorcycle seat 10 for two people, the driver seat 12 being illustrated as partly broken away. Conventionally, the passenger's seat 14 is located behind the driver's seat 12 which has a back support portion 16. The entire seat 10 has a rigid base portion 18 having a substantially inverted U-shape cross sectional configuration over which cushioning material 20 such as foam or the like conventionally is disposed and an exterior covering 22 of leather, vinyl or the like overlays the cushioning. As aforesaid, conventional seats of this type have a number of problems which create uncomfortable conditions for the riders such as, for example, by not permitting even distribution of the pressure points of the body touching the seat. Thus, as illustrated, in accordance with the present invention a portion of the conventional cushioning material 20 is removed from the interior of the seat and replaced by a unique cushion 24 construction which may be selectively deformed by permitting air within the foam to be removed and distributed selectively.

Figure 2:
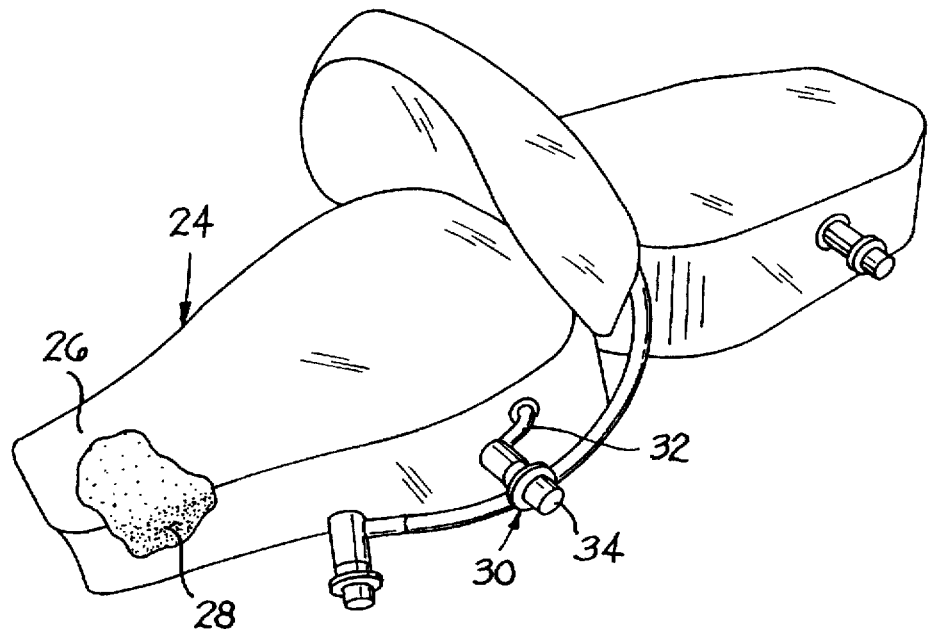
FIG. 2 is a perspective view illustrating the cushioning structure of the seat illustrated in FIG. 1.

As illustrated in FIG. 2, the cushion 24 comprises an outer skin or bladder 26 comprising an air impermeable material such as polyurethane sheeting which encloses an interior cushioning material 28 able to hold and release air. The cushioning material 28 is a multi-cellular foam preferably a urethane foam which may be compressed with relative ease. As the foam is compressed air within the cells is expelled, and when the compression on the foam is released air re-enters the cells of the foam. In accordance with the present invention, the cushioning material 28 is sealed within the airtight outer skin bladder 26 except for a valve member 30 which includes a conduit 32 extending through the bladder 26 in sealed relationship therewith and into the foam cushioning 28. The valve member includes an actuating plunger member 34 which is spring biased outwardly from the body of the valve member 30 to shut communication between the air outside the seat and the conduit, and thus the foam. When the plunger 34 is depressed to overcome the urging of the spring, communication opens between the conduit and ambient conditions, and air may exit or enter from between the plunger and the valve body and through the conduit 32 from or into the foam. The passenger's seat 14 and also the back support 16 may also have such deformable structure. Such a structure may have been previously used for lumbar support in trucks, but no such structure is known to have been suggested for use with seats.

When a person sits on the seat and depresses the plunger 34 air within the cells of the foam where compressed at the points of engagement by the person's body, is expelled from the foam and the foam re-forms to the shape of the person in accordance with the compression points, for example, the shape of the person's buttocks. The plunger is then released and the foam remains in that shape. As the person shifts about without depression of the plunger to let air in or out, the air within the cells is repositioned within the foam since the air cannot escape from the bladder but can only be repositioned within the cells as the pressure points of the person shift. Lateral support is thus provided to the person and the soft tissues of the buttocks remain tucked in under the bony prominences and prevents pressure on the bones from increasing with time, i.e., the seat provides resistance against the tendency of the soft tissues spreading aside and keeps some of the tissue tucked in under the pelvis. The pressure points are thus evenly distributed as the user changes position. Extensive testing bears out the fact that pressures on the buttocks are reduced and capillary closing is substantially reduced. Moreover, the position and angles of the person's legs may be changed periodically for comfort. Additionally, by opening the valve again and lifting off the seat, air may re-enter other cells of the foam to further inflate the bladder so that the height of the seat relative to the ground may be varied selectively. A motorcyclist may desire more cushioning on the road, and less cushioning in the city where his or her feet will engage the ground more frequently. This may be readily accomplished with the present invention.

Although the seat has been disclosed in regard to a motorcycle seat, the invention is applicable to any type of seating as aforesaid. Additionally, numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A seat including a base having an upper surface, a cushion disposed on the base, and filler material disposed on the cushion and the remainder of the upper surface of the base, and a covering disposed over the seat to enclose the base, the cushion and the filler material and defining the exterior surfaces of the seat, said cushion comprising: a resilient multi-cellular foam material capable of holding air within the cellular structure, an air impermeable bladder disposed about said foam material encasing and sealing said foam material within said bladder, a valve including a conduit extending through said bladder in sealed relationship therewith and terminating within said foam material, said valve including an operator disposed externally of said covering for opening and closing communication between said conduit and ambient air external of said seat, whereby air selectively may be expelled from said foam material through said conduit when said foam material is compressed and deformed and air may reenter deformed foam material when compression is relieved.

2. A seat as recited in claim 1, wherein said foam material is urethane.

3. A seat as recited in claim 1, wherein said bladder comprises polyurethane sheet material.

4. A seat as recited in claim 3, wherein said foam material is urethane.

5. A seat as recited in claim 1, wherein said seat comprises a motorcycle seat having a pair of downwardly extending sides about which the legs of a rider may straddle while in a seated position on said seat, said cushion being disposed in the central portion of said upper surface, and said filler material being further disposed on the sides of said base.

6. A seat as recited in claim 5, wherein said foam material is urethane.

7. A seat as recited in claim 5, wherein said bladder comprises polyurethane sheet material.

8. A seat as recited in claim 7, wherein said foam material is urethane.

\* \* \* \* \*